United States Patent [19]

Vergona

[11] Patent Number: 4,667,256
[45] Date of Patent: May 19, 1987

[54] CIRCUIT FOR ELECTRO-OPTIC MODULATORS

[75] Inventor: Albert B. Vergona, Rochester, N.Y.

[73] Assignee: Eastman Kodak Company, Rochester, N.Y.

[21] Appl. No.: 802,106

[22] Filed: Nov. 25, 1985

[51] Int. Cl.⁴ .................. H04N 1/21; G01D 9/42; G09G 3/00
[52] U.S. Cl. .................. 358/302; 358/296; 346/108; 340/811
[58] Field of Search .............. 346/46, 108; 358/296, 358/302; 307/270, 584; 340/811, 813

[56] References Cited

U.S. PATENT DOCUMENTS

| | | | |
|---|---|---|---|
| 3,392,341 | 7/1968 | Burns | 330/13 |
| 3,508,051 | 4/1970 | Nichols et al. | 346/108 |
| 3,694,673 | 9/1972 | Au | 307/304 |
| 3,739,194 | 6/1973 | Freeman et al. | 307/214 |
| 3,775,693 | 11/1973 | Proebsting | 330/35 |
| 3,789,312 | 1/1974 | Heller et al. | 330/35 |
| 3,913,026 | 10/1975 | Koehler | 330/35 |
| 3,946,327 | 3/1976 | Hsu | 330/35 |
| 4,190,836 | 2/1980 | Kimura et al. | 340/811 X |
| 4,356,453 | 10/1982 | Sueyoshi | 330/277 |
| 4,482,868 | 11/1984 | Whatley | 330/274 |

Primary Examiner—E. A. Goldberg
Assistant Examiner—Linda M. Peco
Attorney, Agent, or Firm—Raymond L. Owens

[57] ABSTRACT

A circuit is disclosed which responds to an input voltage signal for adjusting the voltage applied across electrodes of an electro-optic modulator. The circuit includes two FETs connected in series. These FETs are operated as voltage controlled variable resistances. The electrodes are connected in parallel across one of these resistances. These resistances are vary in response to the input voltage signal to change the voltage applied across the electrodes. The circuit draws low current while providing sufficient bandwidth for exposing high quality images.

6 Claims, 6 Drawing Figures

CIRCUIT FOR ELECTRO-OPTIC MODULATORS

BACKGROUND OF THE INVENTION

1. Field of the Invention

The present invention relates to circuits which apply a voltage across electrodes of electro-optic modulators to change the intensity of light at a photosensitive surface.

2. Description of the Prior Art

Electro-optic materials are those whose optical properties change in accordance with the strength of an electric field established within them. These materials make possible an electrically controlled "electro-optic modulator." In this disclosure, the term "modulator" includes a device which changes the intensity of light in response to an applied electric signal. An "electro-optic modulator" includes a member formed of electro-optic material which receives plane polarized (linear) light and which changes the state of polarization of such light in response to an established electric field. An analyzer receives light from the member and blocks that light whose plane of polarization has not changed (no established electric field) while transmitting light when its plane of polarization has been changed by an established electric field. By changing the electric field in the electro-optic member, light which passes through the analyzer is modulated.

One example of an electro-optic material used in modulators is lanthanum-doped lead zirconate titanate (PLZT). Although PLZT is a preferred electro-optic material, it will be recognized by those skilled in the art that other electro-optic materials can also be used to change the polarization of light.

Without an electric field being established, some compositions of PLZT are optically isotropic, while others exhibit a static birefringence. In either case, when a voltage is applied across electrodes and an electric field is established through a member made of PLZT, the PLZT crystal structure changes. This change in crystal structure causes a change in birefringence. An optic axis is thereby formed which is aligned parallel to the electric field lines. The optic axis is a direction and not just one particular line. The applied voltage produces the electric field. The intensity of the field causes the polarization of light to rotate. Thus, the intensity of light which passes through a modulator is a function of the applied voltage.

Problems exist with such PLZT electro-optic modulators. Changes in output light can occur with a fixed voltage applied across the electrodes. Also the intensity of light at a given voltage is often dependent on whether the applied voltage was increased or decreased to achieve that level. This is known as a hysteresis effect.

Because of this hysteresis effect, commonly assigned U.S. Pat. No. 4,631,551, issued Dec. 23, 1986 to Vergona discloses an apparatus where the light intensity at the output of the modulator is compared with the desired level to decide if changes should be made in the voltage applied across the electrodes of the modulator. This arrangement includes a feedback arrangement which produces a voltage signal which is a function of the difference in intensity of the light beam from a desired level. This voltage signal drives a circuit which changes the voltage applied across the modulator electrodes. The voltage applied ($V_{applied}$) across the electrodes should have a relatively wide voltage range to achieve a desired gray scale. Since this voltage at the high end of this range can be in the order of several hundred volts, a high current expensive power supply maybe required. Another important consideration is to provide the circuit with adequate bandwidth to reduce distortions that can appear in $V_{applied}$.

The object of this invention is to provide a circuit for adjusting the voltage applied across an electro-optic modulator electrodes which does not draw an excess current while still providing an adequate bandwidth for the exposure of high quality images.

SUMMARY OF THE INVENTION

This object is achieved by a circuit responsive to an input voltage signal for adjusting the voltage applied across electrodes of an electro-optic modulator to effect a change in the electric field established by such applied voltage, comprising:

(a) a source of DC potential;

(b) first and second FETs which operate as voltage controlled variable resistances $B_{DS1}$ and $R_{DS2}$, respectively, the first and second FETs being connected to the DC source so that $R_{DS1}$ and $R_{DS2}$ are connected in series to the DC potential;

(c) the electrodes of the electro-optic modulator being respectively connected to the drain and source electrode of the first FET so that the electro-optic modulator is connected in parallel with the resistance $R_{DS1}$; and (d) control means coupled to the first and second FETs and responsive to variations in the input voltage to inversely vary resistance $R_{DS1}$ and $R_{DS2}$ so as to change the voltage applied across the electrodes of the electro-optic modulator.

This circuit is particularly suitable for use in a color imaging apparatus which includes three separate light modulating channels such as shown in FIG. 1.

A feature of this invention is that this circuit varies the values of $R_{DS1}$ and $R_{DS2}$ to provide an adequate signal bandwidth which does not cause distortions in $V_{applied}$.

Another feature of this invention is that the resistance $R_{DS1}$ is at a low level when the input voltage is low to thereby causes a fast depletion of the voltage applied across the electrodes. This feature is advantageously used between exposures as will be described in the detailed description.

An advantage of this invention is that it permits the use of an inexpensive low current power supply without reducing the bandwidth of the circuit.

DETAILED DESCRIPTION OF THE PREFERRED EMBODIMENT

Figure 1:
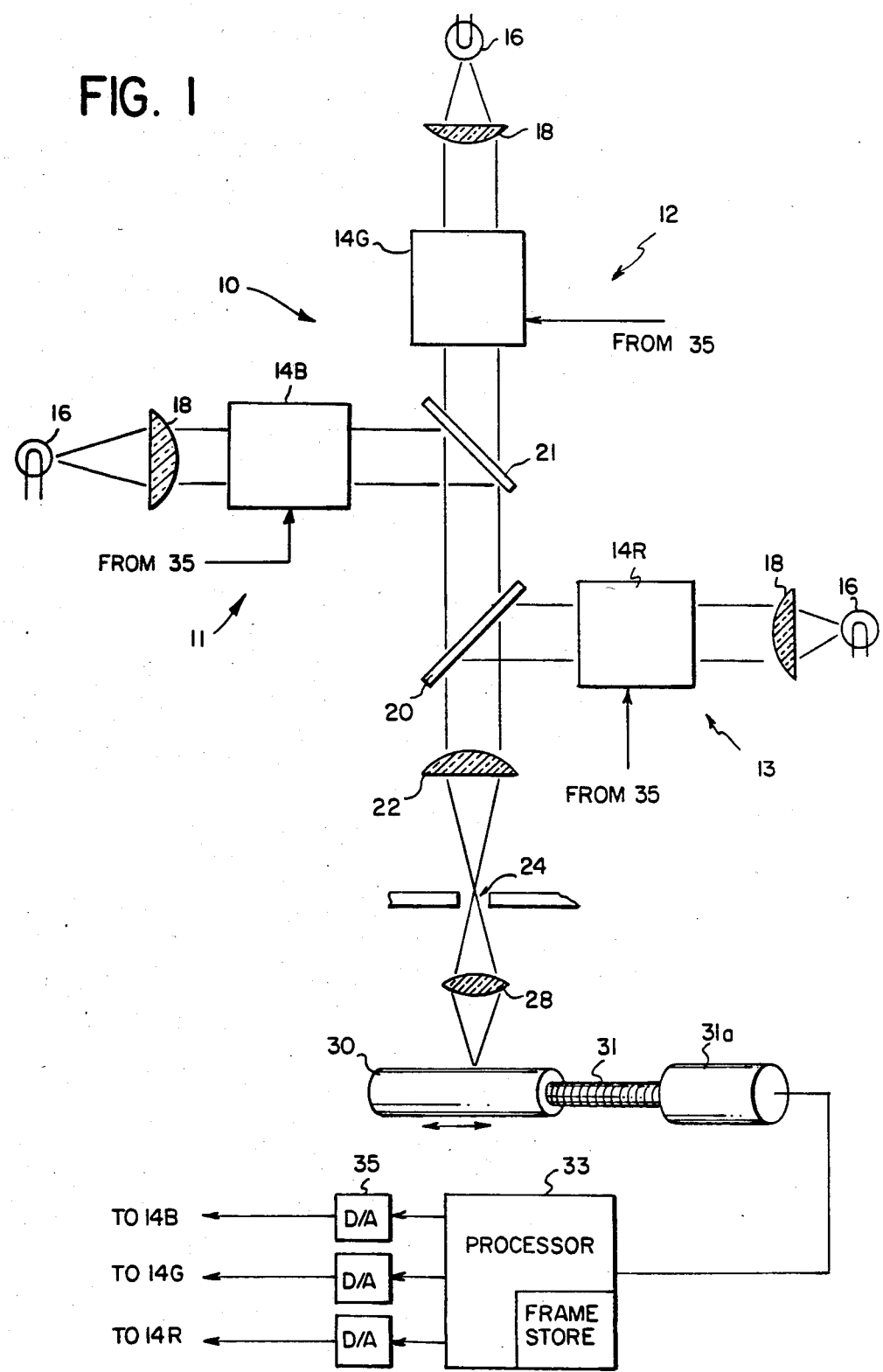
FIG. 1 is a schematic illustration of a color imaging apparatus.
Figure 2:
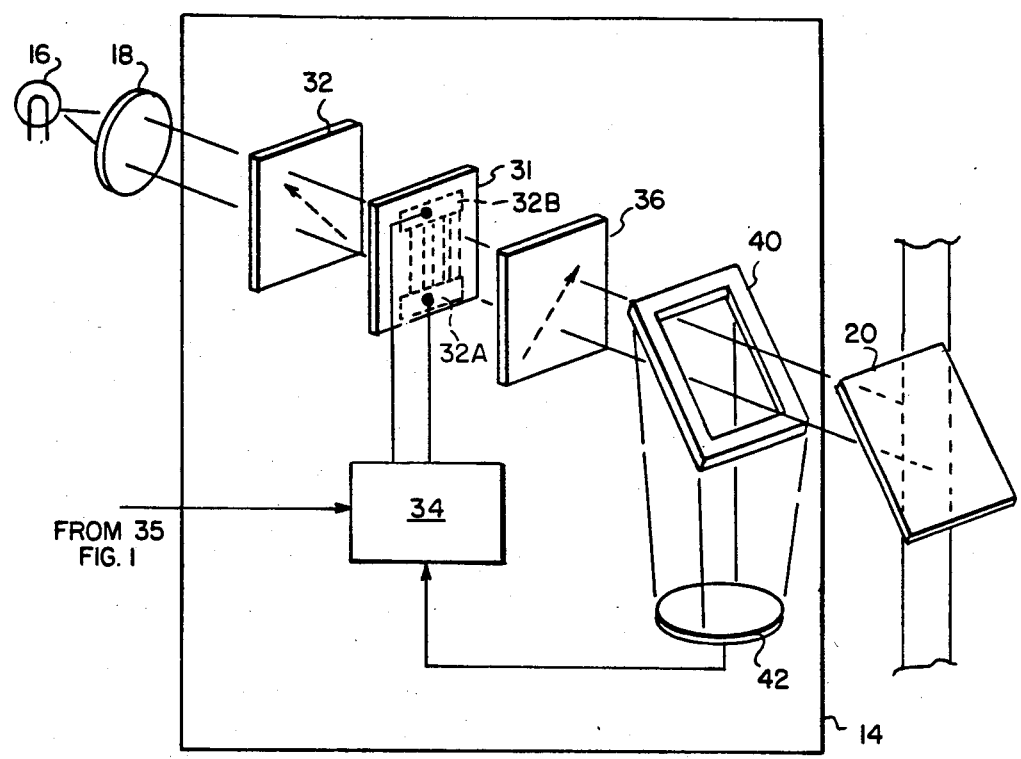
FIG. 2 shows in more detail a light channel of FIG. 1.
Figure 3:
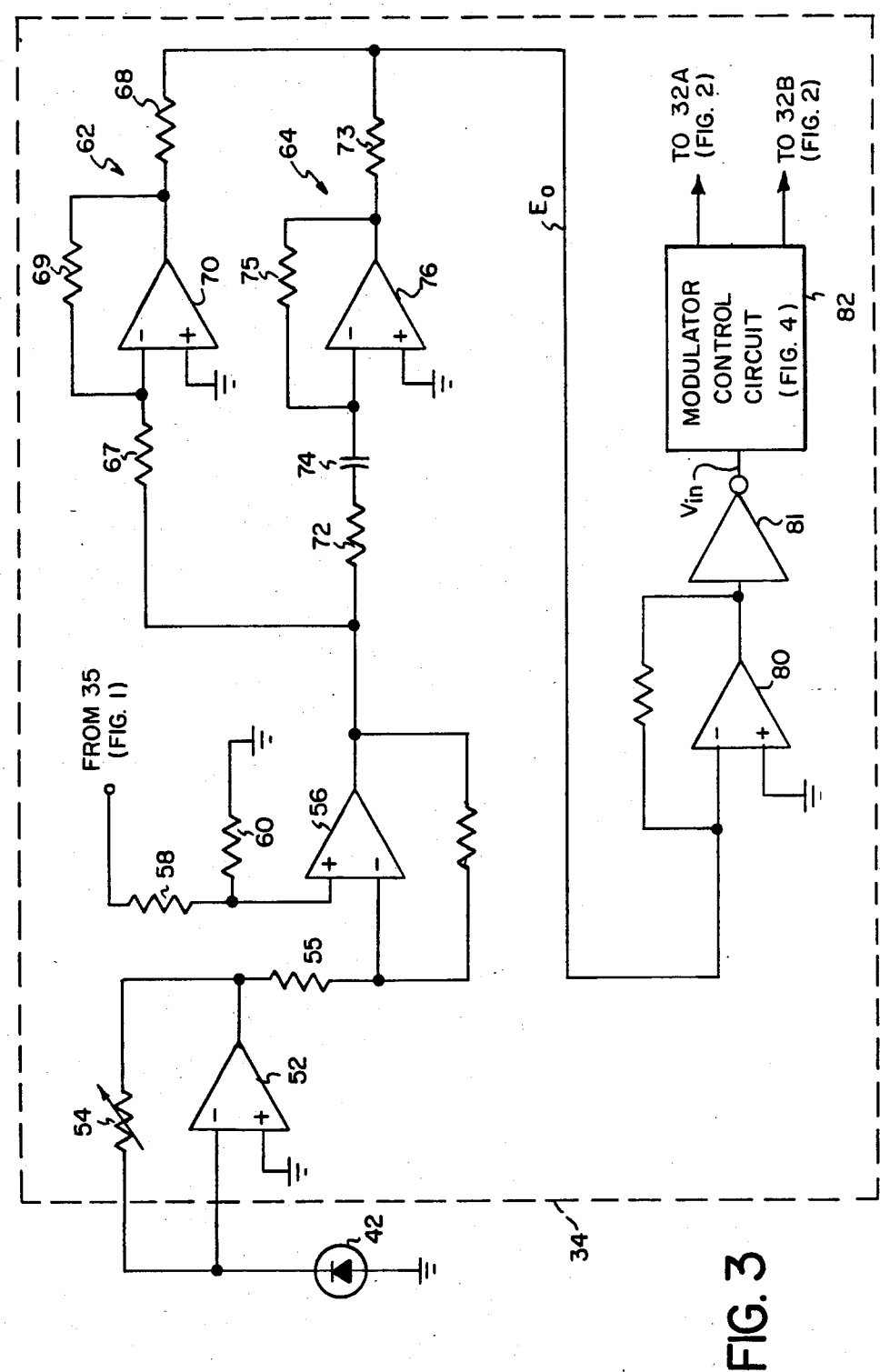
FIG. 3 shows in schematic form the feedback and control network for the light channel of FIG. 2.

FIG. 1 schematically illustrates one color imaging apparatus with which the present invention can be used. The apparatus, denoted generally 10, comprises blue, green and red light channels 11, 12 and 13, respectively. Each light channel includes an electro-optic light modulator 14. The details of modulator 14, as well as a feedback arrangement, are shown in FIGS. 2 and 3, respectively. Each channel includes a panchromatic, incoherent light source 16. Such a source may be provided by a conventional Xenon arc lamp or a tungsten halogen lamp.

In each channel, light from the source 16 illuminates a collimator lens 18 which collimates the light and directs it to the modulator 14. The modulator 14 intensity modulates the light as a function of the amplitude of an analog input electrical signal $V_{applied}$. Modulated light from the blue channel 11 is incident upon a dichroic mirror 21. Mirror 21 separates the blue component from the incident light and changes the direction of this blue light component and directs it to a focusing lens 22. In a similar fashion, the red light component of the light from the channel 13 is directed by a mirror 20 to the lens 22. As shown, dichroic mirror 21 receives light from the channel 12. It passes the intensity modulated green light component and directs it to the mirror 20. The mirror 21 does not change the direction of this green light component and it is directed to the focusing lens 22. The lens 22 combines the red, green and blue, intensity modulated, light beam components and focuses them as a single beam at an aperture 24. Light passes through the aperture 24 and is collected by a lens 28. Lens 28 focuses this light beam as a spot on the surface of a photosensitive member disposed on a drum member 30. The photosensitive member will be understood to include both silver and non-silver color sensitive imaging layers.

After a spot is recorded on the photosensitive member, light from each channel is substantially shut off and the drum 30 is translated by a lead screw 31 which is driven by a stepper motor 31a. A microprocessor 33 controls the operation of stepper motor 31a. The microprocessor 33 will be understood to include a frame store memory that contains a color digital image. After the microprocessor provides signals to the motor 31a which translated the drum 30 to a new position, it provides color signals to digital to analog converters 35 which provide blue, green and red analog signals to their respective modulators 14. A new light beam, produced by the combined color components from each channel, forms another spot on the surface of the photosensitive member on the drum 30. Adjustments are made to the intensity of light of each color component as the spot is being exposed. After a line of spots has been exposed, the drum 30 is rotated (by means not shown) to a position where a new line can be scanned.

Turning now to FIG. 2, there is a more detailed view of an electro-optic modulator 14 which can be employed in the channels in the FIG. 1 embodiment. The modulator 14 includes an electro-optic member 31, an analyzer 32 and a polarizer 36. The arrow across the analyzer 32 indicates the direction of plane polarized light electric field (E-vector) transmitted by the analyzer 32. The electro-optic member 31 includes a substrate formed of an electro-optic material, preferably an optically isotropic PLZT which changes its birefringence in response to the establishment of an electric field in the substrate. Formed on the member 31 are two spaced electrodes 32A and 32B, respectively. These electrodes receive the $V_{applied}$ voltage signal from the feedback and control network 34. The lines between these electrodes represent the electric field. The electrodes 32A and 32B can be built into the substrate or they can be deposited on the substrate by any of several means well-known in the art such as by vacuum deposition of metals and photolithography. While the electrodes may be formed of any suitable material, metals such as chrome-gold, titanium-gold and chrome-nickel-gold are particularly effective.

The electric field caused by the voltage $V_{applied}$ between the electrodes 32A and 32B is oriented generally perpendicular to the incoming collimated light and establishes an optic axis in the substrate in the same direction as the established electric field. The strength of the electric field controls the rotation of the plane of polarization of the incident light. The polarizer 36 has its optic axis arranged perpendicular to the optic axis of the analyzer 32. When the strength of the electric field established in the substrate of the member 31 causes the plane of polarization of incident light to rotate 90°, then a maximum intensity of light will pass through the polarizer 36. At lower intensities of established electric field, a lower intensity of light will pass through the polarizer 36. Of course, it is highly desirable that the electro-optic modulator 14 perform in a linear fashion over a wide dynamic range of $V_{applied}$ as it modulates the intensity of light.

With reference to FIG. 2, light which passes through the polarizer 36 passes through an opening in a mirror member 40 and is directed onto dichroic mirror 20. A small sample of light is reflected off the mirror 40 and is directed down upon a photocell 42. Photocell 42 provides an input signal to the feedback and control network 34 representative of the beam intensity at the output of the modulator 14. The level of this input signal is compared with the level of the analog input signal as will now be described.

Turning now to FIG. 3, the photocell 42 is shown as a photodiode connected as an input to the inverting input of an operational amplifier 52. By adjusting the resistance of a resistor 54, the signal level at the output of the operational amplifier 52 can be adjusted. This output signal is applied by way of a resistor 55 to the inverting input of operational amplifier 56. The other input to operational amplifier 56 is one of the analog input signals from an digital/analog converter 35. The level of this analog signal is scaled by resistors 58 and 60 and represents the desired intensity of a color light component. The output of amplifier 56 is an error signal $E_o'$. This error signal $E_o'$ can introduce oscillations in the adjustment of the voltage applied to the light modulator 14 since it can cause unacceptable transient responses such as overshooting and peaking. It is adjusted by two circuits.

These two circuits are: a proportional gain circuit 62 and a differentiator circuit 64. The output of these circuits is an error signal Eo which has been compensated to produce a desired transient response. This error signal is applied to the inverting input of operational amplifier 80. The output of amplifier 80 is applied to an inverter 81 which applied a voltage signal $V_{in}$ to modulator control circuit 82. Circuit 82 applies a voltage signal to electrodes 32A and 32B of member 31. In response to the input voltage signal $V_{in}$ circuit 82 adjusts the voltage applied across the electrodes 32A and 32B such that the output light intensity is at the desired level indicated by the analog input signal.

Returning briefly to circuit 62, it operates a proportional gain inverting amplifier circuit which includes input and output resistors 67 and 68, respectively, and a feedback resistor 69 for an operational amplifier 70. Circuit 64 is a differentiator circuit which reduces overshoots and includes input and output resistors 72 and 73, respectively, an input capacitor 74 and a feedback resistor 75 across an operational amplifier 76.

Figure 4B:
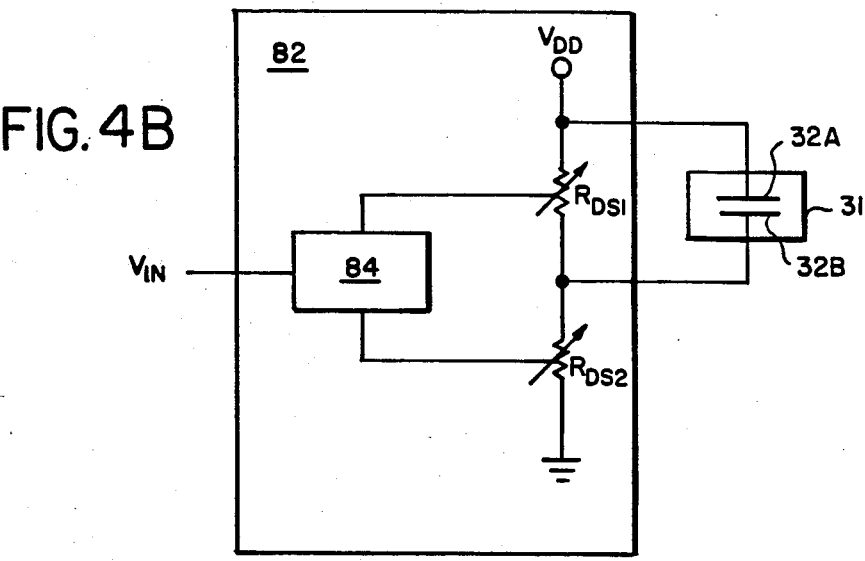
FIG. 4B is a model of the circuit 82.
Figure 4A:
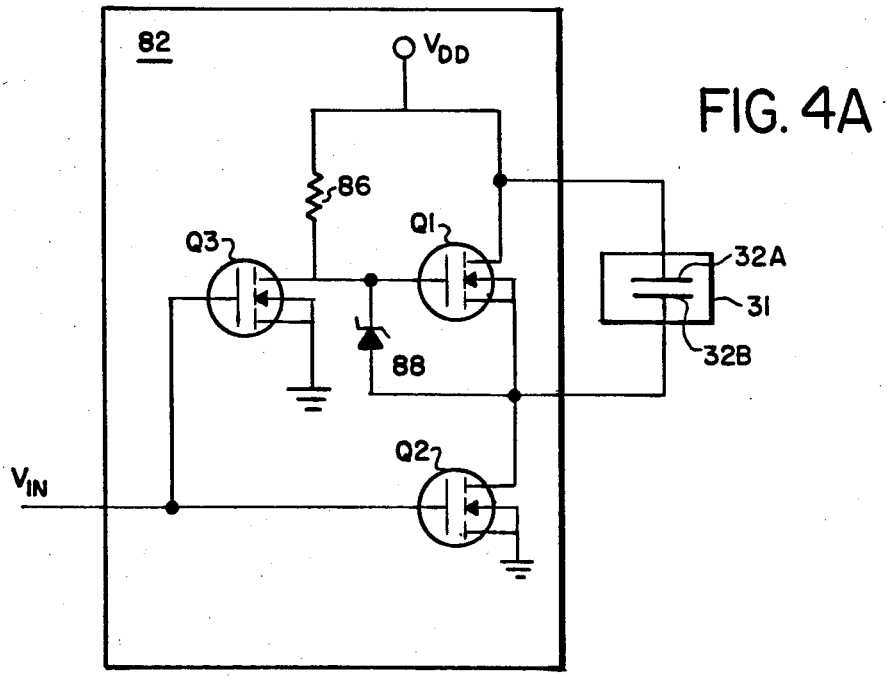
FIG. 4A is a schematic circuit diagram showing details of the modulator control circuit 82 shown in FIG. 3

As shown in FIG. 4A, circuit 82 contains three ($Q_1$, $Q_2$ and $Q_3$) N-Channel MOSFETS which we will hereafter refer to as FETs. Each of these FETs is operated as a voltage-controlled resistor. As is well known, there is a linear region in which an FET can be operated as variable resistance. The value of resistance is determined by the gate to source voltage ($V_{GS}$). This resistance can be approximated by the relationship:

$$R_{DS} = \frac{1}{2K(V_{GS} - V_T)}$$

where:
$V_T$ is the pinch-off or threshold voltage of the transistor; and
K is a constant usually expressed in mA/V$^2$. K depends upon the geometry of the transistor and properties of the materials forming the transistor.

FIG. 4B shows a model of the FIG. 4A circuit. The transistor $Q_1$ has a variable resistance $R_{DS1}$ and the transistor $Q_2$ has a variable resistance $R_{DS2}$. These resistances are connected in series to a DC power supply shown as $+V_{DD}$. Control means 84 includes transistor $Q_3$, resistor 86 and a zener diode 88 shown in FIG. 4A. The electrodes 32A and 32B are respectively connected across the source and drain electrodes of transistor $Q_1$. In the model these electrodes are shown connected in parallel with variable resistance $R_{DS1}$.

Figure 5:
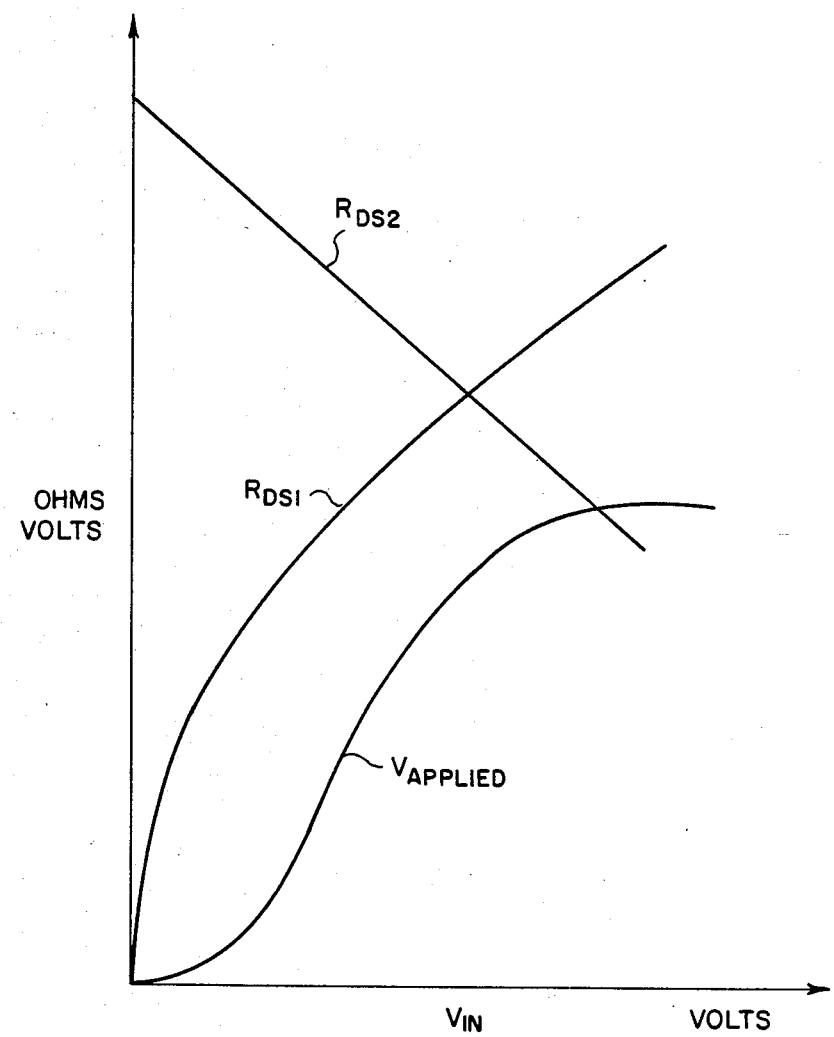
FIG. 5 is a graph showing typical values of resistances of transistors $Q_1$ and $Q_2$ and $V_{applied}$ for the circuit shown in FIG. 4A.

Viewing FIG. 5, when $V_{in}$ is high, the voltage applied ($V_{applied}$) across the electrodes 32A and 32B should be high. To accomplish this result, the control means 84 increase the resistance $R_{DS1}$ while reducing the resistance $R_{DS2}$. Conversely, when $V_{in}$ is lowered, $R_{DS2}$ is increased and $R_{DS1}$ reduced. The resistances $R_{DS1}$ and $R_{DS2}$, inversely vary as a function of the level of the input voltage $V_{in}$. The circuit 82 provides a relatively low driving impedance for the PLZT modulator keeping $V_{applied}$ rise and fall times short while at the same time drawing a relatively low current. Accordingly, the electro-optic modulator 31 can be driven by a circuit which only needs an inexpensive low current power supply ($V_{DD}$). The circuit provides a wide bandwidth because of the operation of the variable resistances $R_{DS1}$ and $R_{DS2}$ as will now be explained.

Let us consider the electro-optic modulator to be a capacitor connected in parallel across the resistance $R_{DS1}$. When the resistnace of $R_{DS1}$ is low, the resistance of $R_{DS2}$ is high and the bandwidth is quite wide. The time constant ($\tau$) of the circuit is approximately equal to ($R_{DS1} \parallel R_{DS2}$)·C, where C is the capacitor of the PLZT. The bandwidth of the circuit is inversely proportioned to the time constant. In other words $$\tau \simeq \frac{R_{DS1} + R_{DS2}}{R_{DS1} \cdot R_{DS2}} \times C.$$

As we can see, when either $R_{DS1}$ or $R_{DS2}$ is low, $\tau$ will be low and the bandwidth wide. Thus circuit 82 provides adequate bandwidth for exposing high quality images.

As shown in FIG. 4A the source electrode of transistor $Q_3$ is connected through the biasing resistor 86 to $+V_{DD}$ and also to the gate electrode of transistor $Q_1$. The zener diode 88 is connected between the gate electrode of transistor $Q_1$ and the source electrode of transistor $Q_2$. The drain and source electrodes of transistors $Q_1$ and $Q_2$ are connected. $V_{in}$ is coupled to the gate electrodes of transistors $Q_1$ and $Q_2$.

When $V_{in}$ is raised, the resistance of transistors $Q_2$ and $Q_3$ is lowered. This causes $R_{DS2}$ to be lowered and $V_{GS1}$ to be reduced. $R_{DS1}$ is of coarse raised. $V_{applied}$ is thereby increased. In a similar manner, when $V_{in}$ is reduced, $R_{DS1}$ will be lowered, $R_{DS2}$ raised and $V_{applied}$ lowered. The zener diode 88 functions as a protection device. When $V_{in}$ is lower, the breakdown voltage $V_Z$ of diode 88 is selected to limit the maximum value of $V_{GS1}$ to prevent the source to gate voltage of transistor $Q_1$ from exceeding its breakdown voltage.

After exposure of a spot on the surface of the photosensitive member, it is desirable to reduce $V_{applied}$ and then move the photosensitive member to a new position before the next spot is exposed. During this movement $V_{in}$ is reduced and $R_{DS1}$ will also be reduced. By reducing $R_{DS1}$, $V_{applied}$ will be quickly reduced thereby shutting off the light in each channel.

The invention has been described in detail with particular reference to a preferred embodiment thereof, but it will be understood that variations and modifications can be effected within the spirit and scope of the invention.

I claim:

1. A circuit responsive to an input voltage signal for adjusting the voltage applied across electrodes of an electro-optic modulator to effect a change in the electric field established by such applied voltage, comprising:
   (a) a source of DC potential,
   (b) first and second FETs which operate as voltage controlled variable resistances $R_{DS1}$ and $R_{DS2}$, respectively, the first and second FETs being connected to the DC source so that $R_{DS1}$ and $R_{DS2}$ are connected in series to the DC potential,
   (c) the electrodes of the electro-optic modulator being respectively connected to the drain and source electrode of the first FET so that the electro-optic modulator is connected in parallel with the resistance $R_{DS1}$; and
   (d) control means coupled to the first and second FETs and responsive to variations in the input voltage to inversely vary resistance $R_{DS1}$ and $R_{DS2}$ so as to change the voltage applied across the electrodes of the electro-optic modulator.

2. A circuit responsive to an input voltage designed for adjusting the voltage applied across electrodes of an electro-optic modulator to effect a change in the electric field established by such applied voltage comprising:
   (a) a source of DC potential;
   (b) first, second and third FETs each having drain, source and gate electrodes, such FETs operate as voltage controlled variable resistances $R_{DS1}$, $R_{DS2}$, and $R_{DS3}$ respectively, the source electrode of the first FET being connected to the DC potential source, the drain and source electrode of the first and second FETs being respectively connected, the source electrode of the third FET being respectively connected to the DC potential source and the gate electrode of the first FET:

(c) the electrodes of the electro-optic modulator being connected to the drain and source electrodes of the first FET so that the electro-optic modulator is connected in parallel with the resistance $R_{DS1}$; and (d) the input voltage being applied to the gate electrodes of the second and third FETs such that the resistances $R_{DS2}$ and $R_{DS3}$ vary inversely with the resistance $R_{DS1}$ to thereby change the voltage applied across the electrodes of the electro-optic modulator.

3. The circuit as set forth in claim 2 including a zener diode connected across the gate and drain electrodes of the first FET to limit the level of the voltage applied between the gate and drain electrode.

4. Color imaging apparatus for forming a beam of light having three separate intensity modulated color components and for line scanning such beam across the surface of a photosensitive member for image recording, comprising:

(a) three separate color component light modulating channels, each including:
   (i) a panchromatic, incoherent light source;
   (ii) means for collimating light from the source;
   (iii) an electro-optic modulator having spaced electrodes responsive to a voltage signal applied across such electrodes for establishing an electric field which modulates the intensity of collimated light from the source passing through it in accordance with the desired intensity of a color component;
   (iv) feedback means for sensing the intensity of light at the output of the modulator to produce an input voltage signal which is a function of the difference in intensity of the color component from a desired level; and
   (v) a circuit responsive to the input voltage signal for adjusting the voltage applied across the electrodes of the electro-optic modulator to effect a change in the electric field established by such applied voltage, having:
      (a') a source of DC potential;
      (b') first and second FETs which operate as variable resistances, $R_{DS1}$ and $R_{DS2}$ respectively, the first and second FETs being connected to the DC source so that $R_{DS1}$ and $R_{DS2}$ are connected in series to the DC potential;
      (c') the electrodes of the electro-optic modulator being connected to the drain and source electrodes of the first FET so that the electro-optic modulator is connected in parallel with the resistance $R_{DS1}$; and
      (d') control means coupled to the first and second FETs and responsive to variations in the input voltage to inversely vary resistances $R_{DS1}$ and $R_{DS2}$ so as to insure the voltage applied across the electrodes of the electro-optic modulator and cause the light intensity at the modulator output to be at the desired intensity;

(b) means including two dichroic mirrors for separating light from each channel into an intensity modulated, color component;

(c) means for combining the color components into a single beam and for focusing such beam on the surface of the photosensitive member; and (d) means for providing relative movement between the photosensitive member and the beam for line scanning the beam across the member's surface.

5. Color imaging apparatus as set forth in claim 4, wherein the source of light is either a xenon lamp or a tungsten halogen lamp.

6. Color imaging apparatus as set forth in claim 5, wherein said photosensitive member is linearly movable to effect line scanning.

* * * * *